US011858800B2

(12) United States Patent
Erwin et al.

(10) Patent No.: US 11,858,800 B2
(45) Date of Patent: Jan. 2, 2024

(54) FLUID EXCHANGER

(71) Applicant: BG Intellectuals, Inc., Wichita, KS (US)

(72) Inventors: Michael J. Erwin, Augusta, KS (US); Bradley Robert Young, Wichita, KS (US); Lucas Mitchell Shaw, Topeka, KS (US); Thomas Michael Probus, Witchita, KS (US); John Daniel Cheek, Wichita, KS (US)

(73) Assignee: BG Intellectuals, Inc., Wichita, KS (US)

( * ) Notice: Subject to any disclaimer, the term of this patent is extended or adjusted under 35 U.S.C. 154(b) by 0 days.

(21) Appl. No.: 18/111,288

(22) Filed: Feb. 17, 2023

(65) Prior Publication Data

US 2023/0202826 A1 Jun. 29, 2023

Related U.S. Application Data

(62) Division of application No. 17/362,467, filed on Jun. 29, 2021, now Pat. No. 11,629,044.

(60) Provisional application No. 63/050,533, filed on Jul. 10, 2020.

(51) Int. Cl.

| | |
|---|---|
| ***B67D 7/78*** | (2010.01) |
| ***B67D 7/42*** | (2010.01) |
| ***B67D 7/02*** | (2010.01) |
| ***B67D 7/36*** | (2010.01) |

(52) U.S. Cl.

CPC ......... *B67D 7/0277* (2013.01); *B67D 7/0266* (2013.01); *B67D 7/0294* (2013.01); *B67D 7/36* (2013.01); *B67D 7/425* (2013.01); *B67D 7/78* (2013.01)

(58) Field of Classification Search

CPC .. B67D 7/0277; B67D 7/0266; B67D 7/0294; B67D 7/36; B67D 7/425; B67D 7/78; B67D 7/02; B67D 7/04; B67D 7/42

See application file for complete search history.

(56) References Cited

U.S. PATENT DOCUMENTS 3,168,967 A * 2/1965 Giampa ............... B67D 1/0084 222/145.5
3,590,890 A * 7/1971 Young .................. B67D 7/3236 141/192
3,867,999 A * 2/1975 Cox ................... F01M 11/0458 137/234.6
4,454,896 A * 6/1984 Barrett, Jr. .......... H01M 50/618 251/280

(Continued)

*Primary Examiner* — Nicolas A Arnett
(74) *Attorney, Agent, or Firm* — SHOOK, HARDY & BACON L.L.P.

(57) ABSTRACT

A fluid exchanger may exchange a fluid (e.g., coolant) in a reservoir (e.g., vehicle radiator) by removing or withdrawing a first fluid (e.g., old, spent, used, etc.) and by introducing a second fluid (e.g., new, clean, etc.). For example, the fluid exchanger may use a negative pressure, suction, or vacuum to draw the first fluid from the reservoir, and subsequently, the second fluid may be transferred into the reservoir using a negative pressure held in the reservoir, a positive pressure applied to the second fluid, or a combination thereof. The fluid exchanger may also include a multi-purpose, hand-held nozzle that can change an operation of the fluid exchanger from a withdrawing mode to a dispensing mode.

8 Claims, 4 Drawing Sheets

(56) References Cited

U.S. PATENT DOCUMENTS 4,877,066 A * 10/1989 Okamizu ................. G05D 9/12
141/96
5,456,295 A * 10/1995 Taylor .................... B67D 7/565
141/192
5,738,499 A * 4/1998 Evans ................... B60T 17/222
222/400.7
6,378,657 B2 * 4/2002 Viken ................ F01M 11/0458
184/106
6,772,803 B2 * 8/2004 Awad ........................ F04F 1/02
141/7
6,779,633 B2 * 8/2004 Viken .................... F01M 11/04
141/94
6,830,082 B2 * 12/2004 Few .......................... B60S 5/00
141/2
7,111,650 B2 * 9/2006 Few ......................... F01P 11/06
141/59
8,118,198 B1 * 2/2012 Watson .................. B65D 25/48
222/529
10,363,907 B2 * 7/2019 Erwin ................. F16H 57/0408
10,947,873 B2 * 3/2021 Bach ....................... F04B 43/12
11,629,044 B2 * 4/2023 Erwin .................. B67D 7/0277
141/231
11,655,136 B2 * 5/2023 Szeteli ................ B05B 11/0008
141/351
2002/0023691 A1 * 2/2002 Capstran ............ F01M 11/0458
141/59
2004/0079442 A1 * 4/2004 Flynn ....................... F01P 11/06
141/98
2004/0084105 A1 * 5/2004 Awad ........................ F04F 1/02
141/59
2006/0016832 A1 * 1/2006 Koch ................... B67D 7/0277
222/383.1
2013/0287593 A1 * 10/2013 Erwin ..................... F04B 23/02
417/63
2017/0138250 A1 * 5/2017 Tseng ................... B67D 7/0288

* cited by examiner

FLUID EXCHANGER

CROSS-REFERENCE TO RELATED APPLICATIONS

This application is a divisional of U.S. patent application Ser. No. 17/362,467 (filed Jun. 29, 2021), which claims the priority benefit of U.S. Patent Application Ser. No. 63/050,533 (filed Jul. 10, 2020). Each of the aforementioned applications are incorporated herein by reference in its entirety.

TECHNICAL FIELD

This disclosure relates to a fluid exchanger for exchanging fluids in a reservoir, such as in a cooling system of a vehicle.

SUMMARY

Embodiments of the present disclosure relate to a fluid exchanger. Systems and methods are disclosed that exchange a fluid (e.g., coolant) in a reservoir (e.g., vehicle radiator) by removing or withdrawing a first fluid (e.g., old, spent, used, etc.) and by introducing a second fluid (e.g., new, clean, etc.). For example, the fluid exchanger may use a negative pressure, suction, or vacuum to draw the first fluid from the reservoir, and subsequently, the second fluid may be transferred into the reservoir using a negative pressure held in the reservoir, a positive pressure applied to the second fluid, or a combination thereof.

BRIEF DESCRIPTION OF THE DRAWINGS

The present systems and methods for a fluid exchanger are described herein with reference to the figures listed directly below, which are incorporated herein by reference. These figures are submitted together with this disclosure.

DETAILED DESCRIPTION

Figure 1:
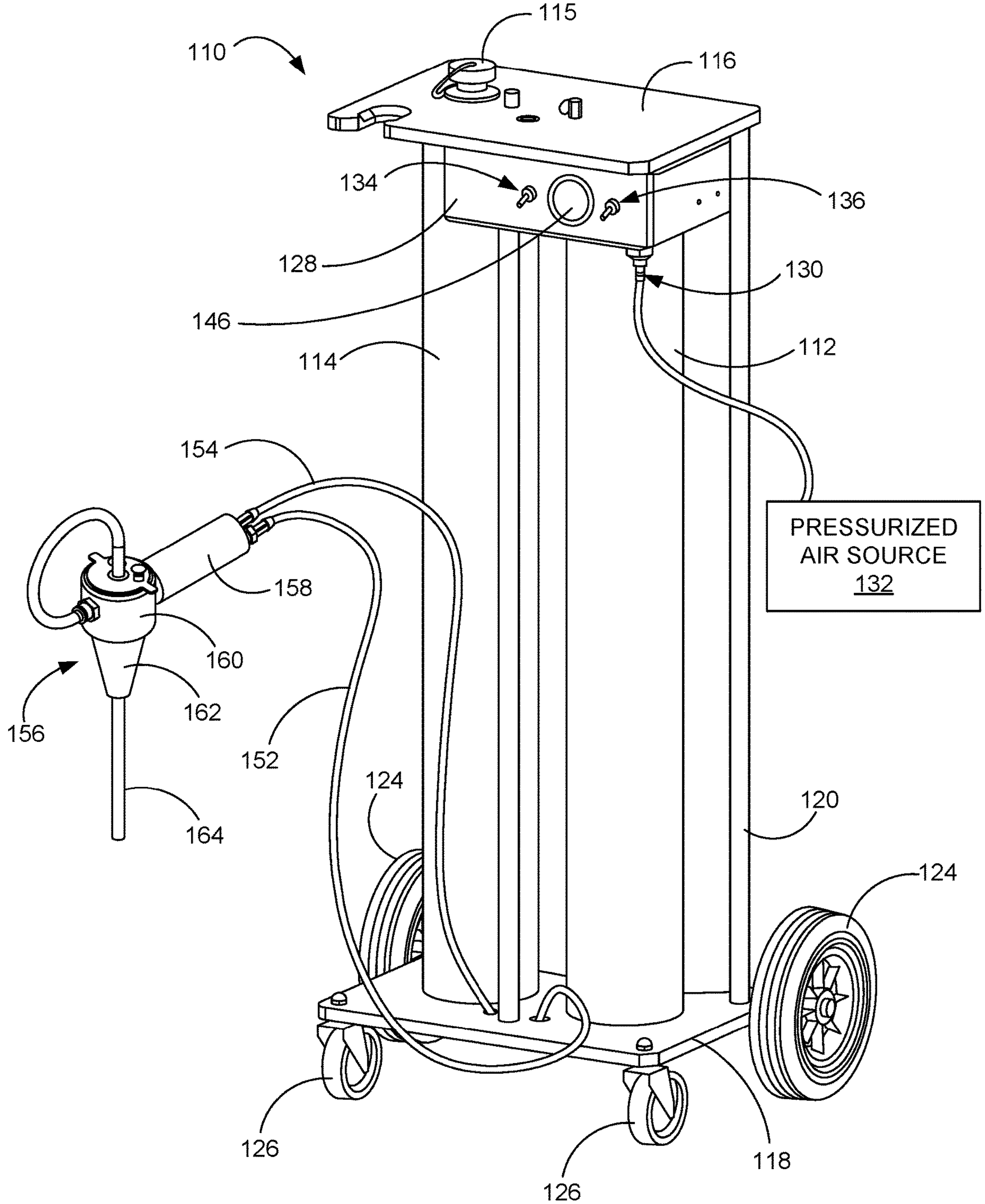
FIG. 1 is an example fluid exchanger in accordance with an embodiment of the present disclosure.

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

At a high level, this disclosure describes systems and methods related to a fluid exchanger that exchanges fluid (e.g., coolant) in a reservoir (e.g., radiator or other coolant reservoir). Vehicle maintenance includes changing the fluid in a fluid system by removing old fluid and adding new fluid. In some systems, a negative pressure may be applied to the reservoir to vacuum or suction old fluid from the reservoir. New fluid may then be added to the reservoir by using a negative pressure held in the reservoir, a positive pressure applied to a new fluid storage tank, or a combination thereof.

Conventional fluid-exchange systems may include an old-coolant tank and a new-coolant tank, housed together on a cart or other transport assembly with a control panel for changing operations between vacuum and pressure. In addition, these systems often include a hose extending from each tank to one or more nozzles or dispensers, which are used to connect to a reservoir (e.g., radiator), such that the nozzle(s) may be stretched some distance away from the control panel to service a vehicle. Conventional approaches often include a control on the control panel for switching between vacuum and pressure; however, because the control panel is positioned away from the dispenser during the service, a technician may have to perform extra steps at the control panel, which take time and focus away from other tasks.

The present disclosure describes a fluid exchanger that includes fluid circuitry, plumbing, conduit, etc. to draw a first fluid (e.g., old coolant) from a reservoir (e.g., coolant system) into a first tank, to introduce a second fluid (e.g., new coolant) from a second tank into the reservoir, and if desired, to discharge the first fluid from the first tank for disposal. In contrast to conventional systems that can be complex with more user controls, the present disclosure includes a minimal number of controls for easier and more efficient operation. In addition, the present disclosure includes a multi-functional, hand-held nozzle that combines multiple operations into a single tool, including sealingly connecting to the reservoir, changing between a first operation mode (e.g., drawing fluid) to a second operation mode (e.g., introducing fluid), and viewing a status of operations (e.g., whether fluid is flowing to or from the reservoir). Furthermore, the system of the present disclosure quickly and efficiently transitions from servicing a first reservoir to a second reservoir (e.g., on the same vehicle or on a different vehicle) without requiring manipulation of controls on the control panel—i.e., the system can be operated using only the nozzle. In contrast, conventional systems often include multiple tools, each having separate and limited functionality that independently seal, change modes, and indicate a flow status. In addition, conventional systems often require a technician to operate controls on the control panel before and after servicing each reservoir.

With reference to FIG. 1, FIG. 1 is an example fluid exchanger 110 in accordance with one aspect of the present invention. At a high level, the fluid exchanger 110 includes a first tank 112 for holding a first fluid (e.g., used coolant) and a second tank 114 for holding a second fluid (e.g., new coolant). The first tank 112 and the second tank 114 may include at least a portion that is transparent to permit the fluid inside to be viewed (e.g., to view the fluid level, whether the fluid level is raising or lowering, etc.). For example, each tank may be constructed of a clear fiber glass material, or a portion of each tank may include a longitudinal viewing window. In another aspect, each tank 112 and 114 includes a tube (e.g., clear fiber glass tube) that is capped at a top end by a top plate 116 and capped at a bottom end by a bottom plate 118.

As depicted in FIG. 1, the fluid exchanger 110 includes tie rods (e.g., 120) that couple the top plate 116 to the bottom plate 118 and generally hold the various portions of the fluid exchanger 110 together. In addition, the bottom plate 118 includes wheels for transporting the fluid exchanger, including fixed direction wheels 124 and caster wheels 126. As such, the fluid exchanger 110 may be transported by rolling (e.g., like a hand truck or dolly), such as by using the tie rods as handles.

Figure 2:
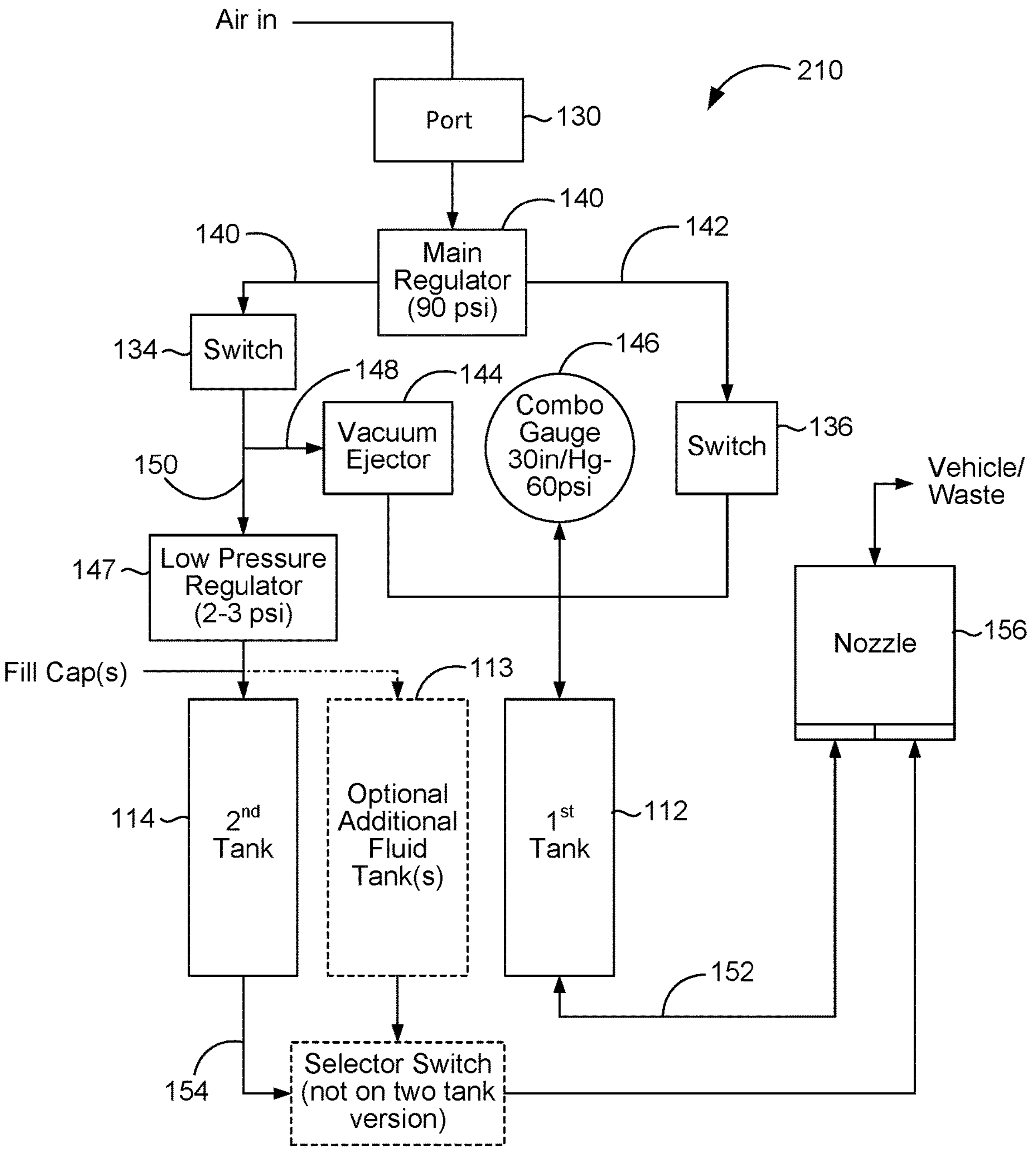
FIG. 2 is an example of a system of components that might be included in the fluid exchanger of FIG. 1 in accordance with an aspect of the present disclosure.

In a further aspect, the fluid exchanger 110 includes a control housing 128 containing various components for controlling operation of the fluid exchanger 110. For example, the control housing 128 includes a port 130 for connecting to a source 132 of pressurized air (e.g., shop air other compressed air source). In addition, the control housing 128 includes a first switch 134 and a second switch 136 for controlling operations of the fluid exchanger 110 that leverage pressurized air from the source 132. For example, the first switch 134 and the second switch 136 may control the flow of pressurized air through various fluid conduits to control whether either positive pressure or suction is applied to each of the first tank 112 and the second tank 114. FIG. 2 illustrates an example of components that might be controlled by the switches 134 and 136 and that might be at least partially contained in the control housing 128, in accordance with one aspect of the present disclosure.

Referring to FIG. 2, FIG. 2 depicts a block diagram of a system 210 of components of the fluid exchanger 110 according to one aspect. Some components of the system 210 that are depicted in FIG. 2 may not be shown in FIG. 1, and these components may be obscured from view or housed in the control housing 128. Among other things, FIG. 2 depicts various pathways extending from the port 130 to the first tank 112 and the second tank 114. These pathways are configured to transport positively or negatively pressurized air or gas and may include various structures, such as conduit, hose, lines, etc. coupled by connectors, fittings, etc.

FIG. 2 includes the port 130 for connecting to a source 132 of pressurized air. In addition, the system 210 includes a pressure regulator 138 for regulating a pressure of the air provided from the source 132. The system 210 includes a first-switch fluid pathway 140 transporting air from the port 130 to the first switch 134 and a second-switch fluid pathway 142 transporting air from the port 130 to the second switch 136. The first-switch fluid pathway 140 and the second-switch fluid pathway 142 may split off from a common conduit or trunk extending from the port 130 and/or the pressure regulator 138. In accordance with one aspect of the present disclosure, the first switch 134 controls flow to a first fluid circuitry of the system 210, and the second switch 136 controls airflow to a second fluid circuitry of the system 210.

In one aspect, the first fluid circuitry includes fluid pathways fluidly coupled with the first tank 112 and the second tank 114 and includes various components to leverage the pressurized air to apply a positive pressure or a negative pressure (vacuum or suction) on the tanks 112 and 114. For example, the first fluid circuitry may include a first tank pathway 148 that imparts a positive or negative pressure on the first tank 112 and a second tank pathway 150 that imparts a positive or negative pressure on the second tank 114. In one aspect, the first tank pathway 148 and the second tank pathway 150 split from a common trunk or conduit at or near the first switch 134.

In one aspect, the first tank pathway 148 includes one or more fluid conduits extending from the first switch 134 to the first tank 112. In addition, the first tank pathway 148 includes an ejector 144 positioned along the first tank pathway 148, and the ejector 144 receives positively pressurized air passing through the first switch 134 and creates a vacuum pulled on the first tank 112. The first tank pathway 148 may also include another pressure regulator 146 controlling a pressure applied to the first tank 112.

In another aspect, the second tank pathway 150 includes one or more fluid conduits extending from the first switch 134 to the second tank 114. Furthermore, the second tank pathway 150 may include a low-pressure regulator 147 for maintaining a relatively low pressure (e.g., 2-3 psi) applied to the second tank 114. In accordance with this disclosure, when the system 210 is pressurized (e.g., receiving pressurized air from the source 132) and the first switch 134 is open, then a vacuum is pulled on the first tank 112 and a positive pressure is applied to the second tank 114.

In accordance with another aspect, the second fluid circuitry of the system 210 that is controlled by the second switch 136 is also coupled with the first tank 112. For example, the second fluid circuitry may include one or more fluid conduits extending from the second switch 136 to the first tank 112, and also controlled by the pressure regulator 146. At least some of the conduits of the second fluid circuitry may also be part of the first tank pathway 148 of the first fluid circuitry (e.g., the conduits may merge or join into one another at a fitting or other connection). In accordance with one aspect, when the system 210 is pressurized (e.g., receiving pressurized air from the source 132) and the second switch 136 is open, then a positive pressure may be applied to the first tank 112.

Referring to FIGS. 1 and 2, FIGS. 1 and 2 both show a first fluid line 152 extending from the first tank 112 and a second fluid line 154 extending from the second tank 114, and the fluid lines 152 and 154 are configured to carry fluid (e.g., coolant) to or from the tanks 112 and 114. For example, each fluid line may connect to the respective tank at a port (obscured from view) near or below the bottom plate 118. In accordance with one aspect of the present disclosure, both fluid lines 152 and 154 connect to a hand-held nozzle 156, which may be used to dispense fluid from the first tank 112 and the second tank 114 or to vacuum fluid to the first tank 112. The first fluid line 152 and the second fluid line 154 may include various types of conduits or hoses, such as metal spiral wrapped hoses.

The hand-held nozzle 156 may include various components. For example, the hand-held nozzle includes a handle 158 for grasping and manipulating the nozzle 156. In addition, the nozzle 156 includes a valve housing 160 containing components for selecting between fluid lines, as well as a reservoir connector 162 (e.g., tapered rubber stopper or cone with through hole) for interfacing with an opening of a reservoir (e.g., fill port for radiator cap) and an insert tube 164 for insertion into the reservoir.

Referring now to FIGS. 3A-3D, an example hand-held nozzle 156, and components thereof, is illustrated in more detail. In general, the nozzle 156 includes connections to the first and second lines 152 and 154; a connection to the insert tube 164; and a valve assembly for selectively fluidly connecting the first and second lines 152 and 154 to the insert tube 164.

Figure 3A:
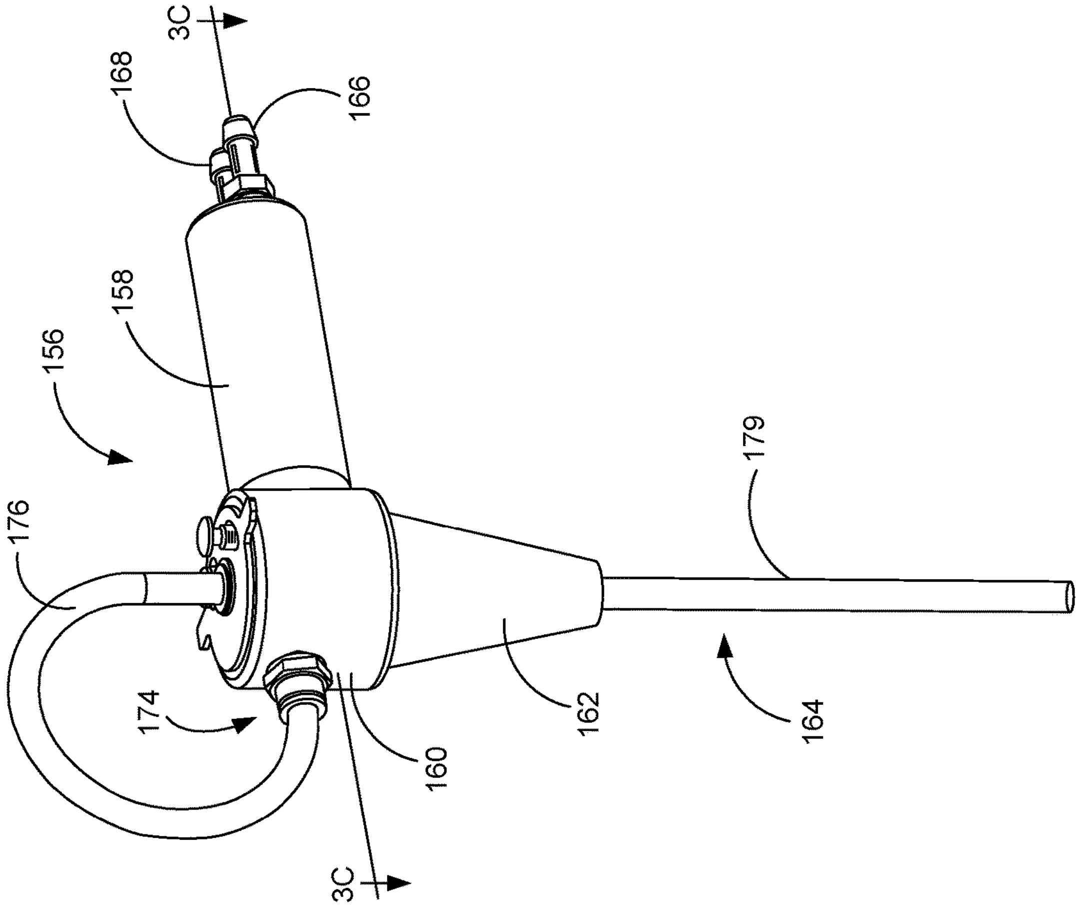
FIGS. 3A-3D depict various views of a hand-held nozzle that might be part of a fluid exchanger in accordance with an aspect of the present disclosure.
Figure 3B:
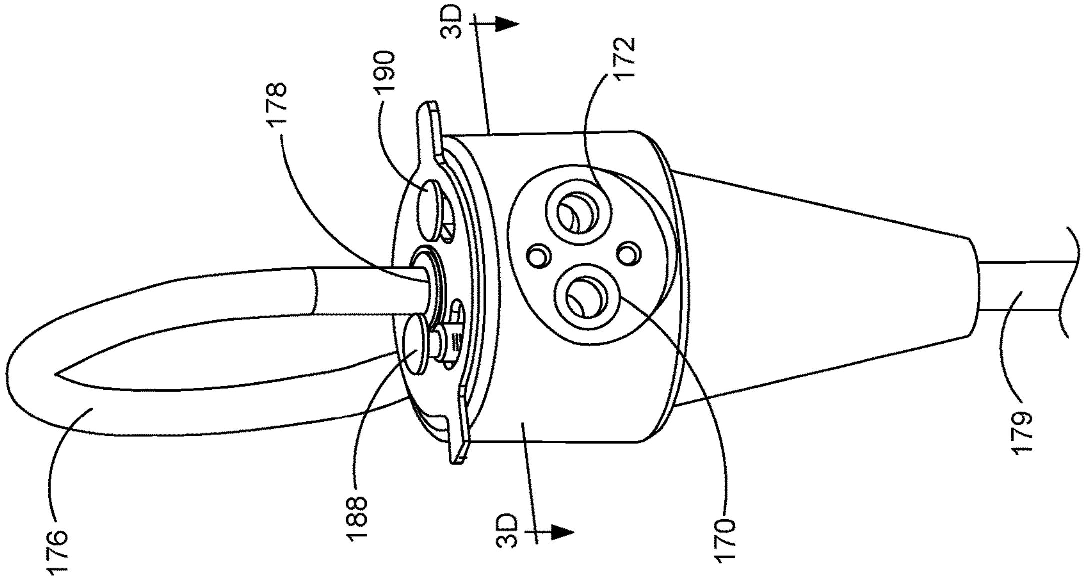
Figure 3C:
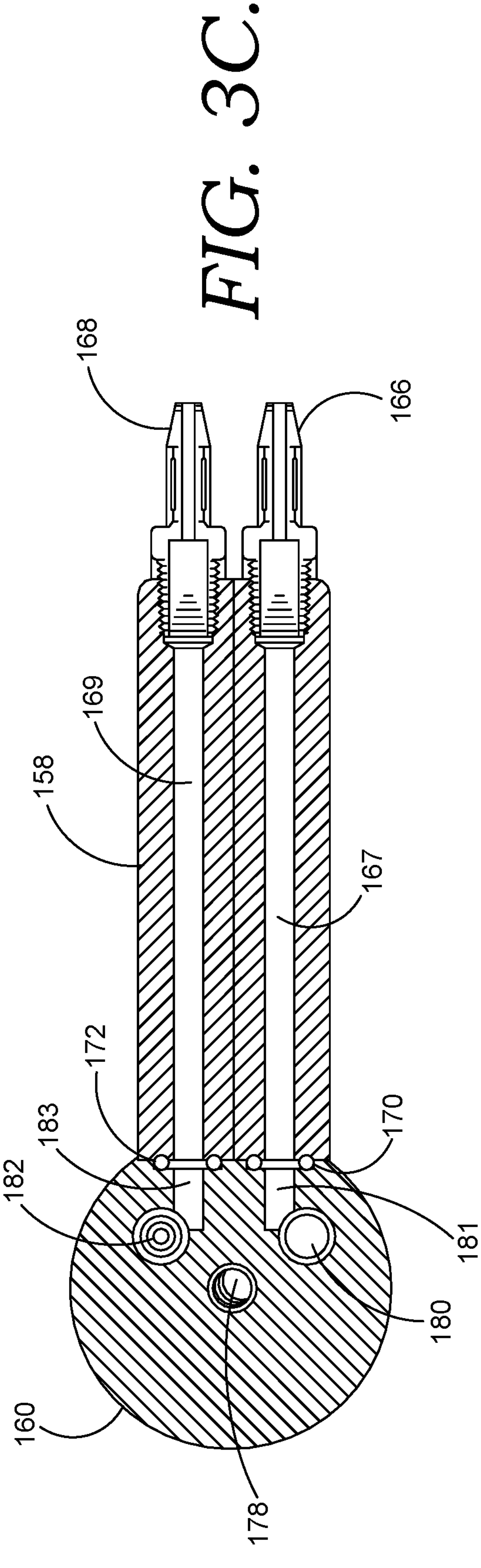
Figure 3D:
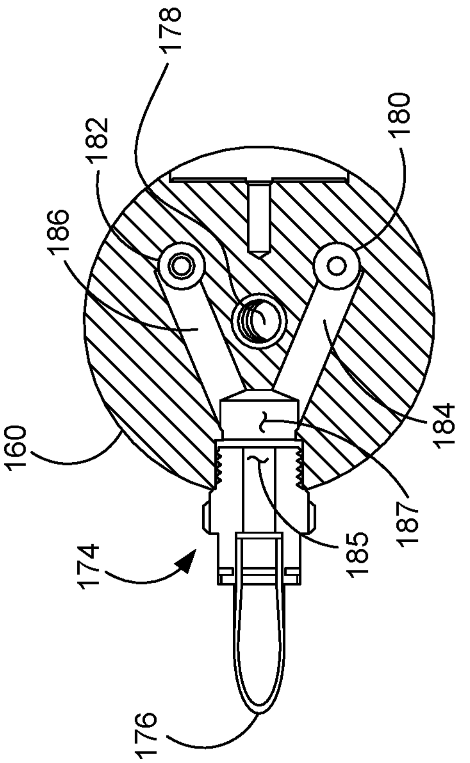

In one aspect, the nozzle 156 includes a first nozzle port 166 for connecting to the first line 152 and a second nozzle port 168 for connecting to the second line 154. For example, the ports 166 and 168 may include a barbed fitting that inserts into the lines 152 and 154. The nozzle ports 166 and 168 are depicted in the end of the handle 158, and in other aspects, the ports 166 and 168 may be positioned at other locations, such as on opposing sides of the valve housing 160. In addition, the nozzle 156 includes a first nozzle fluid channel 167 (e.g., FIG. 3C showing a cross section of the handle) extending from the first nozzle port 166 to the valve housing 160 and a second nozzle fluid channel 169 (e.g., FIG. 3C) extending from the second nozzle port 168 to the valve housing 160. The first nozzle fluid channel 167 and the second nozzle fluid channel 169 are obscured from view inside the handle 158 in FIG. 3A and are shown in a cross section in FIG. 3C. Each nozzle fluid channel may terminate at a sealed connection to the valve housing 160, such as at the respective seal 170 and 172 shown in FIG. 3B (in which the handle 158 is omitted) and 3C. For example, each nozzle port 166 and 168 may include a threaded connection that couples to a through hole in the handle 158, thereby forming the first and second nozzle fluid channels 167 and 169, and when the handle 158 is connected to the valve housing 160, then each through hole may seat against a respective seal 170 and 172.

As indicated above, the valve housing 160 also includes an insert-tube port 174 for connecting the insert tube 164 to the valve housing 160. For example, the valve housing 160 may include a threaded connection or other quick-connect fitting attaching the insert tube 164 to the valve housing 160. In accordance with an aspect of the present disclosure, the insert tube 164 includes a first segment 176 that extends from the connection 174 and extends externally to the valve housing 160. In addition, the insert tube 164 passes through an aperture 178 in the valve housing 160 (viewable in FIG. 3B where the insert tube 164 inserts into the valve housing and also identified in the cross sectional view of FIG. 3C), extending entirely through the valve housing 160. As such, after exiting the valve housing 160, the insert tube 164 includes a second segment 179 extending from the valve housing 160 to a terminal end. Furthermore, the second segment 179 may extend through a through hole in the reservoir connector 162, such that when the reservoir connector 162 is coupled to an opening of a reservoir, the second segment 179 inserts into the reservoir.

In an aspect of this disclosure, a length of the second segment 179 is adjustable to fit reservoirs having different depths. For example, to increase a length of the second segment 179, at least part of the first segment 176 may be fed into the aperture 178, and to decrease a length of the second segment 179, at least part of the insert tube 164 (e.g., along the first segment 176) may be pulled from the aperture 178. Among other things, this adjustability permits the length of the second segment 179 to increase or decrease to adjust to the size of the reservoir and to improve the likelihood that fluid will be drawn from at or near the lowest region of the reservoir. In another aspect of the disclosure, at least a portion of the insert tube 164 (e.g., at least a portion of the first segment 176) is made of a transparent material (e.g., nylon tubing), which permits an operator to view the status of fluid flow through the nozzle. For example, if fluid is being drawn from a reservoir, an operator may view the clear portion of the first segment 176 to determine when lower amounts (or no further amounts) of fluid are flowing, which may indicate all or most of the fluid has been removed from the reservoir.

The valve housing 160 may include various components to selectively connect the first nozzle fluid channel 167 or the second nozzle fluid channel 169 to the insert tube 164. For example, as illustrated in FIG. 3C, the valve housing 160 may include a first valve chamber 180 fluidly coupled with the first nozzle fluid channel 167 by way of a first valve fluid channel 181. In addition, the valve housing 160 may include a second valve chamber 182 fluidly coupled with the second nozzle fluid channel 169 by way of a second valve fluid channel 183. Furthermore, as depicted in the cross-sectional view provided by FIG. 3D, the valve housing 160 may include a third valve fluid channel 184 that fluidly connects the first valve chamber 180 with the insert-tube port 174. That is, the insert-tube port 174 may include a through hole 185 that fluidly connects with the third valve fluid channel 184. In addition, as depicted in the cross-sectional view provided by FIG. 3D, the valve housing 160 may include a fourth valve fluid channel 186 that fluidly connects the second valve chamber 182 with the through hole 185 of the insert-tube port 174. In one aspect, the valve housing 160 includes a third valve chamber 187 abutted by the insert-tube port 174, and the third valve chamber 187 may provide an interface between the third and fourth valve fluid channels 184 and 186 and the through hole 185.

In a further aspect of the disclosure, the valve housing 160 includes a first valve control 188 (FIG. 3B) and a second valve control 190 (FIG. 3B) that may be independently depressed by an operator to selectively connect the first nozzle fluid channel 167 or the second nozzle fluid channel 169 to the insert tube 164. For example, the first valve control 188 is coupled to a spring biased plunger that is seated in the first valve chamber 180 and is biased outward in a closed position (depicted in FIG. 3B) that blocks fluid connection between the first valve fluid channel 181 and the third valve fluid channel 184. When the first valve control 188 is depressed, the plunger moves to an open position that opens fluid connection between the first valve fluid channel 181 and the third valve fluid channel 184. Similarly, the second valve control 190 is coupled to another spring biased plunger that is seated in the second valve chamber 182 and is biased outward in a closed position that blocks fluid connection between the second valve fluid channel 183 and the fourth valve fluid channel 186. When the second valve control 188 is depressed (as shown in FIG. 3B), the plunger moves to an open position that opens fluid connection between the second valve fluid channel 183 and the fourth valve fluid channel 186. In a further aspect, each valve control 188 and 190 (and/or each respective plunger) includes a respective catch mechanism that allows the plunger to be set in an open or closed position, such that the operator may activate the control (by depressing) and release the nozzle 156 while the valve remains in the set position.

The fluid exchanger 110 may include various other elements. For example, a fill cap 115 may be used to add fluid (e.g., new coolant) to the second tank 114. In addition, the reservoir connector 162 may be a first size (e.g., range of diameters based on the taper), and the fluid exchanger 110 may include one or more additional reservoir connectors that are other sizes, smaller or larger than the first size (e.g., smaller or larger tapered cone shape). The reservoir connector 162 may be disconnected from the valve housing 160 and replaced by another reservoir connector having a different size. For example, the valve housing 160 may include a barb or other connector on the bottom that attaches to the reservoir connector 162. Moreover, the insert tube 164 may include a first length, and the fluid exchanger may include one or more other insert tubes that are either shorter or longer than the first length, such that the insert tube 164 may be disconnected from the valve housing 160 and replaced by a different insert tube having a different length. The alternatively sized reservoir connector(s) and the alternatively sized insert tube(s) may be selected based on the size of the reservoir being serviced. In another aspect, the fluid exchanger 110 may include one or more additional tanks (e.g., tank(s) 113 in FIG. 2) for holding other fluid, in which case the system 210 may include one or more other switches for selecting between the second tank 114 and the other tanks.

The fluid exchanger 110 may operate in various manners. For example, in one aspect the fluid exchanger 110 is used to draw used fluid (e.g., coolant) from a reservoir (e.g., radiator) and to dispense new fluid to the reservoir. When initiating the service, the reservoir cap (e.g., reservoir cap) may be removed and the reservoir connector 162 may be inserted into the reservoir fill port. In addition, a length of the insert tube 164 may be adjusted so that the terminal end of the insert tube 164 is at or near the bottom of the reservoir. The port 130 may already be connected to the pressurized air source 132, or if not, then the port 130 is coupled to the air source 132. In addition, the nozzle 156 may already be energized, if the first switch 134 is open, or alternatively the first switch 134 may then be moved to an open position. Once the first switch is open, a vacuum is pulled on the first tank 112 and on the first fluid line 152, and the second tank 114 is pressurized (relatively low pressure via the low-pressure regulator 147) to disperse fluid from the second tank 114 into the second fluid line 154. At that point, the operator may depress the first valve control 188 to fluidly connect the first valve fluid channel 181 and the third valve fluid channel 184, which in turn pulls the vacuum on the insert tube 164 and the reservoir to draw old fluid into the first tank 112. The first valve control 188 may be latched in the open position to allow the used fluid to be drawn without an operator continually pressing the first valve control 188. The operator may observe various conditions to determine when the old fluid has been removed, such as when bubbles may appear stagnant in the first segment 176 of the insert tube 164.

Once the old fluid has been removed from the reservoir, the second valve control 190 may be depressed in order to fluidly connect the second valve channel 183 and the fourth valve channel 186. The valve housing 160 may include a mechanism that closes the first valve control 188 when the second valve control 190 is depressed, or the operator may unlatch the first valve control 188 to close it. Once the second valve channel 183 fluidly connects to the fourth valve channel 186, then new fluid may be dispersed from the second tank 114 to the reservoir using the low positive pressure in the second tank 114, a negative pressure held in the reservoir when the old coolant is drawn out, or a combination thereof. The operator may observer various conditions to determine when new coolant is no longer flowing to the reservoir (e.g., when the bubbles or fluid in the first segment 176 appear stagnant; when a fluid level in the second tank is no longer decreasing), and at that point, the operator may close the second valve control 190.

In accordance with an aspect of the disclosure, the low pressure maintained by the low-pressure regulator 147 in a range of about 1 psi to about 5 psi (and in one embodiment between 2 psi and 3 psi) helps to improve the likelihood that the radiator will be completely filled using the nozzle (as opposed to having to complete an extra top-off step). In addition, with the system already energized, the operator can seamlessly transition to another reservoir (e.g., another reservoir on the same vehicle or on another vehicle) to repeat the process. At that point, the operator only needs to remove the reservoir cap on the next reservoir to be serviced, insert the nozzle 156, and open the first valve control 188. As such, an aspect of the present disclosure may be used in change fluid in systems or vehicles that have multiple reservoirs, such as an additional exhaust gas recirculation system; an electric vehicle with multiple reservoirs (e.g., coolant reservoirs); a hybrid electric vehicle with multiple reservoirs (e.g., coolant reservoirs); etc. Again, the multi-functional, hand-held nozzle provides controls directly at the nozzle, which allows a technician to remove and add fluid quickly, and quickly transition from one reservoir to the next without having to move to, and operate, a separate control panel. Moreover, the relatively low pressure (e.g., 2-3 psi by the low-pressure regulator 147) may enhance usability with systems having low pressure cooling systems. For example, some electric and hybrid electric vehicle systems may include low pressure cooling systems, and the relatively low pressure imparted through the second line 154 may be reduce the likelihood that these systems could be damaged during servicing.

In a further aspect, the fluid in the first tank 112 may be easily dispensed to a waste container. For example, with the port 130 connected to a source 132, the second switch 136 is opened to apply a positive pressure to the first tank 112 and disperse the old coolant from the first tank 112 and into the first fluid line 152. By opening the first valve control 188 the old coolant can then be dispensed through the nozzle 156.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

From the foregoing, it will be seen that this subject matter is well adapted to attain all the ends and objects hereinabove set forth together with other advantages, which are obvious and which are inherent to the structure. It will be understood that certain features and subcombinations are of utility and might be employed without reference to other features and subcombinations. This is contemplated by and is within the scope of the claims. Since many possible alternative versions of the subjected matter might be made without departing from the scope thereof, it is to be understood that all matter herein set forth or shown in the accompanying drawings is to be interpreted as illustrative and not in a limiting sense.

What is claimed is:

1. A method of exchanging fluid in a reservoir of a motor vehicle, the method comprising:

energizing both a first hose associated with a negative pressure and a second hose associated with a positive pressure, the first hose and the second hose being directly coupled to a hand-held nozzle;

inserting the hand-held nozzle into a fill port of the reservoir;

depressing a first valve control on the hand-held nozzle to open a first fluid connection between the first hose and the reservoir; and depressing a second valve control on the hand-held nozzle to open a second fluid connection between the second hose and the reservoir.

2. The method of claim 1, wherein energizing includes simultaneously energizing by opening a switch.

3. The method of claim 1, wherein inserting the hand-held nozzle comprises inserting an insert tube through the fill port; coupling a reservoir connector to the fill port; and sliding the insert tube through the reservoir connector.

4. The method of claim 1, wherein the motor vehicle is undergoing a maintenance service after another motor vehicle previously underwent servicing, and wherein the energizing is performed prior to the other vehicle undergoing servicing without re-energizing between servicing the other motor vehicle and servicing the motor vehicle.

5. The method of claim 1 further comprising, closing the second fluid connection; removing the hand-held nozzle from the fill port and inserting the hand-held nozzle in another fill port; and depressing the first valve control to pull a vacuum on another reservoir.

6. The method of claim 5, wherein the reservoir and the other reservoir are both in the motor vehicle.

7. The method of claim 6, wherein one of the reservoir and the other reservoir is a reservoir for a radiator and the other of the reservoir and the other reservoir is a reservoir of an exhaust gas recirculation system.

8. The method of claim 6, wherein the motor vehicle is electric or hybrid electric.

* * * * *